March 19, 1957 — E. F. WADELTON — 2,785,618
COIL SPRING CULTIVATOR SHANK AND CLAMP
Filed Sept. 11, 1953
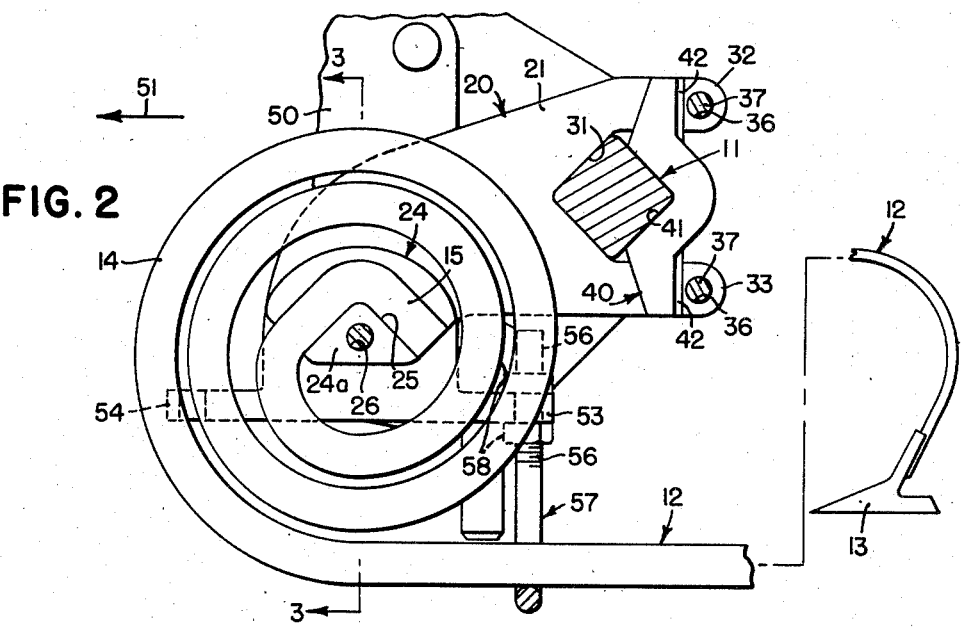
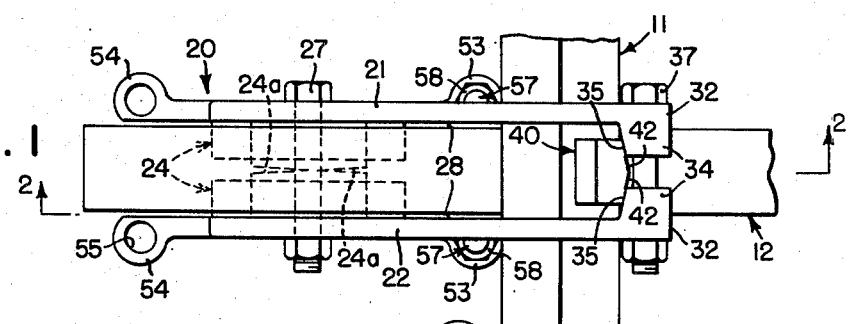
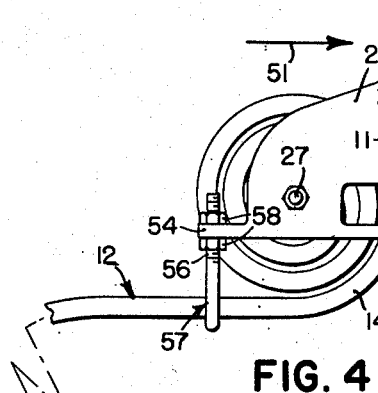
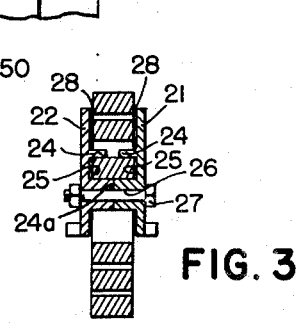
INVENTOR.
EDWIN F. WADELTON
ATTORNEYS United States Patent Office 2,785,618
Patented Mar. 19, 1957

2,785,618

COIL SPRING CULTIVATOR SHANK AND CLAMP

Edwin F. Wadelton, Yakima, Wash., assignor to Deere & Company, Moline, Ill., a corporation of Illinois Application September 11, 1953, Serial No. 379,609

6 Claims. (Cl. 97—198.1)

The present invention relates generally to agricultural machines and more particularly to tool bar implements, wherein a generally transversely arranged, relatively heavy tool bar receives one or more of a number of different kinds of ground-working tools or the like. More particularly, the present invention relates to spring teeth and means for fastening them to a tool bar or the like.

The object and general nature of the present invention is the provision of a new and improved harrow tooth construction. More particularly, it is a feature of this invention to provide means for fastening each of a plurality of harrow teeth or the like to a tool bar so that any of the teeth may be applied to or removed from the tool bar without moving or disturbing the other teeth. It is also a feature of this invention to provide an outboard tooth mounting so constructed and arranged that any tooth or other tool may be connected and/or disconnected without disturbing the others.

A further feature of this invention is the provision of a tool mounting that comprises a pair of bracket plates adapted to be mounted on a tool bar in laterally spaced relation with a tool connected therebetween at one end of the mounting and means at the other end for clamping the bracket plates to the tool bar.

These and other objects and advantages of the present invention will be apparent to those skilled in the art after a consideration of the following detailed description, taken in conjunction with the accompanying drawings, in which:

Figure 1 is a plan view of a tool mounting incorporating the principles of this invention.

Figure 2 is a side view, partly in section, taken generally along the line 2—2 of Figure 1.

Figure 3 is a sectional view, on a reduced scale, taken generally along the line 3—3 of Figure 2.

Figure 4 is a side view showing the manner in which the device of the present invention readily accommodates a reversed mounting of the tool.

The present invention has been illustrated as incorporated in a tool bar mounting for the spring tooth of a spring tooth harrow although it is to be understood that my invention may be incorporated in other tools and supports therefor other than tool bars or the like.

Referring first to Figures 1 and 2, a supporting tool bar 11, which may form a part of a tool carrier to which a plurality of tools, or one or more of a number of other tools, is shown as a part that is square in cross section and arranged with its section disposed diagonally, Figures 2 and 4. A spring tooth is shown at 12 and is provided at one end with a soil working element 13, such as a shovel, sweep or the like, and at the other end is formed into a coil 14 the inner end 15 of which is shaped like an inverted V. The coil 14 comprises several turns as illustrated in Figure 2.

Each tool or tooth 12 is connected to the supporting tool bar 11 by mounting or attachment means 20 that includes a pair of right- and left-hand bracket plates 21 and 22. At one end each plate carries tool-receiving means in the form of a laterally inwardly extending lug 24 having a slot or notch 25 shaped to receive the adjacent portion of the V-shaped end 15 of the associated tool 12, as best shown in Figure 2. The lugs 24 are apertured, as at 26, and the apertures 26 receive bolt means 27 or the like that effectively connects the tool-receiving ends of the bracket plates 21 and 22. The lugs 24 are formed so that the inner or lower portions 24a each have a length greater than half the width of the spring tooth, as shown in Figures 1 and 3, and when the bolt 27 is tightened and the brackets 21 and 22 are secured in place, the laterally inner portions 24a engage one another but there is clearance, shown at 28 in Figure 3, so that the plates 21 and 22 are not drawn against the side edges of the coil 14. This construction readily accommodates flexing of the coil 14 between the plates 21 and 22, yet the tooth end 15 is securely held in the V-shaped notches or slots 25.

The end of each of the bracket plates 21 and 22 opposite the tool-receiving lug 24 is bifurcated, forming a generally V-shaped notch 31, in which the tool bar 11 may seat as shown in Figures 2 and 4, and upper and lower end sections 32 and 33 which carry laterally inwardly extending cam lugs 34 formed with wedging surfaces 35. The end sections 32 and 33 are apertured, as at 36, to receive transversely extending clamping bolts 37.

A clamp cap member 40 is disposable against the side of the tool bar 11 opposite the side that seats in the bracket notches 31 and is shaped, as at 41, to snugly engage the side of the bar 11. The upper and lower ends of the cap member are formed with wedging or clamping surfaces 42 that interfit with and are complementary relative to the camming or wedging faces 35 on the bracket plates. Thus, as illustrated in Figure 1, tightening the bolts 37 draws the notched ends of the brackets toward one another and in so doing causes the faces 35 to act against the camming faces 42 and force the clamp member 40 against the side of the bar 11, thus seating the latter in the bottom of the notches 31 and securely clamping the plates 21 and 22 to the tool bar 11. It will be noted from Figure 1 that the laterally inner faces of the tool-receiving lugs are slightly rounded or angled so that the bolt 27 when tightened securely holds the tool-receiving ends of the bracket plates together irrespective of variations in the lateral positions of the notched ends of the bracket plates, as may occur when clamping the cap member 40 against the tool bar 11 to secure the brackets to the tool bar.

The tool bar 11 normally forms a part of and is supported on a suitable carrier the frame of which is shown fragmentarily at 50 in Figure 2, the carrier being drawn or propelled in the direction of the arrow 51. In order to stagger the tools 12, which may be desirable or necessary when they are to be spaced relatively close together, they may be arranged on the tool bar 11 with some of the brackets or mounting units 20 disposed forwardly, as in Figure 2, and others extending rearwardly, as in Figure 4. To arrange the proper adjustment of the tools 12 in either position of the associated bracket mounting 20 on the tool bar 11, the following structure is provided.

Each pair of bracket plates 21 and 22 carries an inner pair of lugs 53 and an outer pair of lugs 54. Each lug of each pair is apertured, as at 55, to receive the upper threaded ends 56 of a tool-adjusting U-bolt 57. The lower or bight portion of the U-bolt 57 underlies the tool 12 just outwardly of the coil 14, and the threaded ends 56 receive lock nuts 58 by means of which the vertical position of the U-bolt 57 may be adjusted and fixed. Preferably, the U-bolts 57 are adjusted so as to bring all of the shovels 13 substantially into the same horizontal plane.

When the brackets 20 extend forwardly (Figure 2), the U-bolts 57 are disposed in the lugs 53, and when the brackets 20 extend rearwardly (Figure 4), the U-bolts are disposed in the lugs 54.

Any tool may be removed from and/or changed from one side to the other of the tool bar 11 without disturbing the other tools, merely by removing the bolts 37, loosening the bolt 27, and taking out the clamp cap 40, whereupon the entire unit may be detached from the bar 11 by shifting the unit transversely away from the tool bar 11, and it may be connected to the bar 11, as in another position, in the same manner, all without disturbing the other tools or detaching or disconnecting the tool bar 11 in its carrier.

While I have shown and described above the preferred structure in which the principles of the present invention have been incorporated, it is to be understod that my invention is not to be limited to the particular details, shown and described above, but that, in fact, widely different means may be employed in the practice of the broader aspects of my invention.

What I claim, therefore, and desire to secure by Letters Patent is:

1. In an outboard tool mounting adapted to be secured at one end to a tool bar, the improvement comprising a pair of laterally spaced apart, separate side members, said members being relatively movable and each having an opening through which said toolbar extends, when said side members are mounted thereon in laterally spaced relation, tool receiving means on the other end of at least one of said side members for supporting a tool between said members at the end thereof opposite said tool bar, a clamp member disposed against the side of the tool bar between said members at said one end thereof, means forming wedging surfaces on said clamp member and on laterally inwardly extending portions of said side members adjacent said clamp member and overlying the wedging surfaces on said clamp member, and clamping means acting against said inwardly extending portions for forcing said clamp member against the tool bar.

2. Clamp means for cultivator tools and the like adapted to be connected with a supporting tool bar, said clamp means comprising a pair of tool-receiving brackets, each having a bifurcated end portion adapting the bracket for transverse application to an associated tool bar with each bifurcated portion embracing and disposed on opposite sides of the toolbar, each bracket being movable at its bifurcated portion axially along the toolbar toward and away from the other bracket, wedge means formed on the ends of each of said bifurcated portions, a clamp cap disposed between the bifurcated portion of one bracket and bifurcated portion of the other bracket, said clamp cap also lying between said wedge means and the adjacent portion of a tool bar, wedge means, complementary with respect to and cooperable with the wedge means on said brackets, carried by said clamp cap, fastening means acting against said brackets to force the wedge means on said pair of brackets against the wedge means on said cap, thus serving to force the cap against said tool bar, and tool-receiving means at the other end of each of said brackets.

3. Clamp means for cultivator tools and the like adapted to be connected with a supporting tool bar, said clamp means comprising a pair of tool-receiving brackets, each notched at one end, the end portions of each notch being spaced apart a distance equal at least to the effective diameter of said toolbar, thus adapting the bracket for transverse application to the associated tool bar, the ends of each notched portion having a generally inwardly facing camming surface and apertured outwardly thereof, a clamp cap disposable against one side of said tool bar between said brackets at the notched portions thereof and notched at one side to receive the tool bar opposite the bifurcated portion of said brackets, said clamp cap also having outwardly facing camming faces receiving said first mentioned camming surfaces, and fastening means extending through the apertures in said notched portions for forcing the camming surfaces of the latter against the camming faces of said clamp cap, thereby forcing the latter against said tool bar.

4. Clamp means for cultivator tools and the like adapted to be connected with a supporting tool bar, said clamp means comprising a pair of separate, relatively movable, tool-receiving brackets, each having a bifurcated end portion adapting the bracket for transverse application to an associated tool bar with each bracket extending outwardly from the toolbar substantially at a right angle and each bracket being movable generally axially along the toolbar, a laterally inwardly facing tool-receiving lug adjacent the other end of each bracket, transversely disposed fastening means acting against said other ends of said brackets for securing a tool on said lugs and between said brackets, clamp means at the bifurcated ends of said brackets and acting to shift the bifurcated ends toward one another along the bar, and means engaged between said tool bar and said bifurcated ends whereby movement of the latter toward one another acts to secure said latter ends to said tool bar.

5. Clamp means for cultivator tools and the like adapted to be connected with a supporting tool bar, said clamp means comprising a pair of separate, relatively movable, tool-receiving brackets, each shaped at one end to receive a tool bar and to extend outwardly from said bar in a plane disposed generally perpendicular to said bar, said brackets being secured to said toolbar in parallel spaced apart relation, a laterally inwardly facing tool-receiving lug adjacent the other end of each bracket, said lugs extending toward one another and normally brought into engagement, fastening means acting against said other ends of said brackets for securing a tool on said lugs, said fastening means holding one of said lugs against the other with the tool disposed thereabout, and means acting between the bar-receiving ends of said brackets for fixing the latter to the tool bar.

6. Clamp means for cultivator tools and the like adapted to be connected with a supporting tool bar, said clamp means comprising a pair of tool-receiving brackets, each having a bifurcated end portion adapting the bracket for transverse application to an associated tool bar, a laterally inwardly facing tool-receiving lug adjacent the other end of each bracket, fastening means acting against said other ends of said brackets for securing a tool therebetween on said lugs, a clamp member disposed between the bifurcated ends of said brackets and engageable with one side of said tool bar, fastening means engaging the bifurcated ends of said brackets for drawing the brackets toward one another along the tool bar, and means acting between said clamp member and the bifurcated end portions of said brackets for forcing said clamp member against said one side of the tool bar and thereby forcing the latter against the bottom portions of the bifurcated end portions of said brackets, said last-mentioned means including laterally inwardly extending cam sections on the bifurcated ends of said brackets, said cam sections being angled so that when the bifurcated bracket ends are forced toward one another said clamp member is forced inwardly against the toolbar.

References Cited in the file of this patent
UNITED STATES PATENTS

| | | |
|---|---|---|
| 2,046,942 | Goeller | July 7, 1936 |
| 2,156,208 | Thornton | Apr. 4, 1939 |
| 2,259,890 | Hipple | Oct. 21, 1941 |
| 2,385,950 | Silver | Oct. 2, 1945 |
| 2,490,237 | Silver | Dec. 6, 1949 |
| 2,651,767 | Bergan | Sept. 8, 1953 |
| 2,692,098 | Schmued et al. | Oct. 19, 1954 |